(12) United States Patent
Hussain et al.

(10) Patent No.: US 11,551,632 B2
(45) Date of Patent: Jan. 10, 2023

(54) ACCELERATED FRAME TRANSMISSION

(71) Applicant: ATI TECHNOLOGIES ULC, Markham (CA)

(72) Inventors: Syed Athar Hussain, Markham (CA); Anthony W L Koo, Markham (CA); David I. J. Glen, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/029,736

(22) Filed: Sep. 23, 2020

(65) Prior Publication Data

US 2021/0407456 A1  Dec. 30, 2021

Related U.S. Application Data

(60) Provisional application No. 63/044,529, filed on Jun. 26, 2020.

(51) Int. Cl.
G06F 13/00 (2006.01)
G09G 5/00 (2006.01)
G06T 1/20 (2006.01)
G06T 9/00 (2006.01)

(52) U.S. Cl.
CPC ............... *G09G 5/00* (2013.01); *G06T 1/20* (2013.01); *G06T 9/00* (2013.01); *G09G 2330/023* (2013.01); *G09G 2360/18* (2013.01); *G09G 2370/12* (2013.01)

(58) Field of Classification Search
CPC ..... G09G 2340/0435; G09G 2320/103; G09G 2340/02; G09G 2360/08; G09G 5/005; G09G 5/12; G09G 2370/04; G09G 5/393; G09G 5/395; G09G 2350/00; G09G 2310/04; G09G 2310/08; G09G 2360/127; G06F 3/14; G06T 15/005
See application file for complete search history.

(56) References Cited

U.S. PATENT DOCUMENTS

| | | | | |
|---|---|---|---|---|
| 2012/0242671 A1* | 9/2012 | Wyatt | ..................... | G09G 5/001 345/520 |
| 2015/0381990 A1* | 12/2015 | Kwa | .............. | H04N 21/440263 375/240.02 |
| 2020/0278735 A1* | 9/2020 | Ansari | ................... | G06F 1/3212 |

* cited by examiner

*Primary Examiner* — Hau H Nguyen

(57) ABSTRACT

A graphics processing unit (GPU) of a processing system transmits pixel data for a frame to a display in a compressed burst, so that the pixel data is communicated at a rate that is higher than the rate at which the display scans out the pixel data to refresh the frame at a display panel. By transmitting pixel data for the frame in a compressed burst, the GPU shortens the time spent transmitting the pixel data and extends the time before the next frame of pixel data is to be transmitted. During the extended time before the next frame of pixel data is to be transmitted, the GPU saves power by placing portions of the processing system in a reduced power mode.

20 Claims, 4 Drawing Sheets

ACCELERATED FRAME TRANSMISSION

CROSS-REFERENCE TO RELATED APPLICATIONS

The present application claims priority to Provisional Patent Application Ser. No. 63/044,529, entitled "Accelerated Frame Transmission" and filed on Jun. 26, 2020, the entirety of which is incorporated by reference herein.

BACKGROUND

A typical processing system employs a graphics processing unit (GPU) to generate images for display. Based on commands received from a central processing unit (CPU) or other processing unit, the GPU generates a series of frames and renders the series of frames for a display, such as a computer monitor. The GPU encodes the frames and transmits the frames via an interconnect to the display. The display processes the received encoded data and updates the image at a display panel based on the received data. Typically, the rate at which the GPU transmits frames to the display is synchronized with the rate at which the display updates the display panel. For example, a display with a 60 Hz refresh rate is updated every 16.6 milliseconds (ms). Likewise, the GPU transmits the updated frame to the GPU over a span of 16.6 ms.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for increasing a rate of pixel data transmission from a graphics processing unit (GPU) to a display via an interconnect. Interconnect bandwidth has increased such that a GPU can output pixel data via an interconnect to a display at a rate that is higher than the maximum rate at which the display panel can consume the pixel data. In some embodiments, the GPU outputs pixel data at a rate that is higher than a maximum rate at which the display can use the pixel data, either by updating a display panel at a higher refresh rate or increasing resolution of the display panel. In addition, modern processing systems employ compression techniques such as Video Electronics Standards Association (VESA) Display Stream Compression (DSC) that compress data that is transmitted via the interconnect, allowing for greater amounts of pixel data to be transmitted in a shorter amount of time. For example, an encoder employing DSC can perform visually lossless compression of pixel data up to a ratio of 5:1, enabling a GPU to transmit five times the amount of pixel data as could be transmitted in an uncompressed form in a given period of time. Higher or lower compression ratios are employed in various embodiments.

As described further herein, a GPU of a processing system leverages the high interconnect bandwidth and the high ratio of data compression to conserve power by transmitting pixel data for a frame to a display in a compressed burst, so that the pixel data is communicated at a rate that is higher than the rate at which the display uses the pixel data to update the frame at a display panel. By transmitting pixel data for the frame in a compressed burst, the GPU shortens the time spent transmitting the pixel data and extends the time before the next frame of pixel data is to be transmitted, referred to as the vertical blanking period or vertical blanking interval. During the extended blanking period, the GPU saves power by placing portions of the processing system in a reduced power mode.

Figure 1:
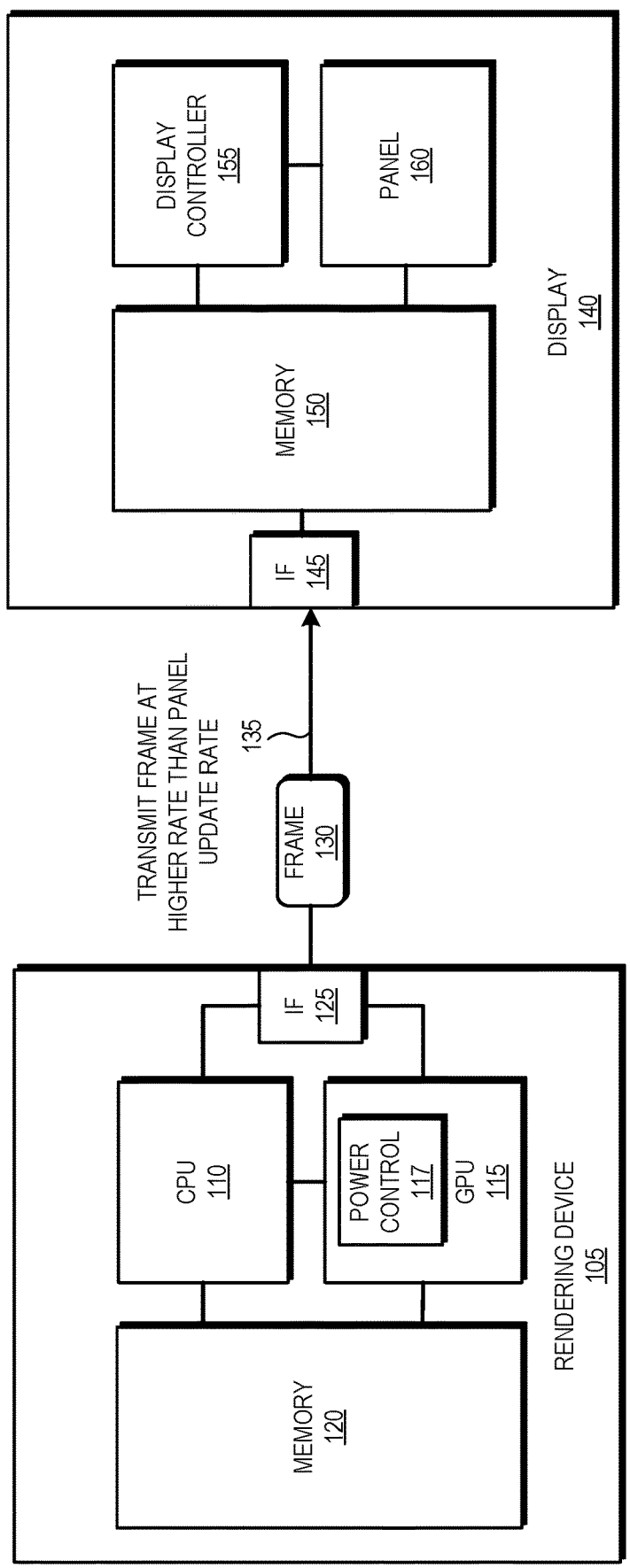
FIG. 1 is a block diagram of a processing system configured to transmit pixel data for a frame to a display device at a higher rate than a display panel update rate in accordance with some embodiments.

FIG. 1 illustrates a processing system 100 configured to transmit pixel data for a frame from a rendering device 105 to a display device 140 at a higher rate than a rate at which the display device 140 scans out the pixel data to refresh a display panel 160 in accordance with some embodiments. The rendering device 105 includes any of a variety of devices used to generate video content, including a notebook computer, a desktop computer, a server, a game console, a compute-enabled smartphone, and the like. The display device 140 includes a digital display device to display video content, such as a digital television, computer monitor, portable device display, and the like. Note that the rendering device 105 and the display device 140, in some implementations, are implemented in the same device, such as in the case of a tablet computer, notebook computer, compute-enabled phone, and the like.

The processing system 100 is generally configured to execute sets of instructions (e.g., computer programs) to carry out specified tasks for an electronic device. Examples of such tasks include controlling aspects of the operation of the electronic device, displaying information to a user to provide a specified user experience, communicating with other electronic devices, and the like. To support execution of the sets of instructions, the rendering device 105 includes at least one memory 120, at least one processor, such as a central processing unit (CPU) 110, and a display interface (IF) 125. In some embodiments, each processor includes one or more instruction pipelines to fetch instructions, decode the instructions into corresponding operations, dispatch the operations to one or more execution units, execute the operations, and retire the operations. In the course of executing instructions, the processors generate graphics operations and other operations associated with the visual display of information. Based on these operations, the processors provide commands and data to a graphics processing unit (GPU) 115.

The GPU 115 is generally configured to receive the commands and data associated with graphics and other display operations from the plurality of processor cores. Based on the received commands, the GPU 115 executes operations to generate frames for display. Examples of operations include vector operations, drawing operations, and the like. The rate at which the GPU 115 is able to generate frames based on these operations is referred to as the frame generation rate, or simply the frame rate, of the GPU 115. It will be appreciated that the frame rate of the GPU 115 varies over time, based in part on the complexity of the operations executed by the GPU 115 to generate a set of frames. For example, sets of frames requiring a relatively high number of operations (as a result of drawing a relatively large number of moving objects, for example) are likely to result in a lower frame rate, whereas sets of frames requiring a relatively low number of operations are likely to allow for a higher frame rate.

The display device 140 includes a display interface 145, a memory 150, a display controller 155, and a panel 160. The display interfaces 125, 145 include wired or wireless interconnect interfaces, such as HDMI interfaces, DisplayPort interfaces, embedded DisplayPort (eDP) interfaces, and the like. The display panel 160 includes a two-dimensional array of pixels used to display a sequence of display images, and includes, for example, a light emitting diode (LED) matrix, an organic LED (OLED) matrix, a liquid crystal (LC) matrix, a matrix of movable mirrors for a digital light processing (DLP) display, or the like.

The display controller 155 is generally configured to control the display of frames at the display panel 160. The display controller 155 is implemented as hard-coded or programmable logic, one or more processors executing software/firmware instructions, or any combination thereof. In some embodiments, the display controller 155 performs operations including buffering of frames generated by the GPU 115 at the memory 150.

The memory 150 holds a frame of pixel data. In some embodiments, the pixel data stored at the memory 150 is compressed using a compression algorithm such as, for example, VESA Display Stream Compression (DSC). The display controller 155 reads the stored pixel data from the memory 150 at an interval based on the current programming of the panel refresh rate.

In some embodiments, the display device 140 is implemented as a variable refresh rate (VRR) display that synchronizes refreshing the display panel 160 with the generation of frames at the GPU 115 such that the refresh rate of the display panel 160 is variable. For example, by adjusting a vertical blanking interval of the display panel 160, the GPU 115 can ensure that the display panel 160 is refreshed only after a new frame is fully written to the back buffer and is ready for display at the display panel 160.

As a general operational overview, the memory 120 stores one or more sets of executable software instructions to manipulate the CPU 110 and GPU 115 to render a video stream including a series of display frames such as display frame 130 and corresponding metadata and to transmit this video stream to the display device 140 via the display interfaces 125, 145 and the interconnect 135. At the display device 140, the display controller 155 receives each display frame and corresponding metadata in turn and processes the display frame for display in sequence at the display panel 160 during a corresponding frame period. As will be appreciated by one skilled in the art, the display device 140 is generally configured to display the most recent frame generated by the GPU 115 by refreshing the display panel 160 using the pixel data that the display device 140 receives from the GPU 115.

Each frame generated by the GPU 115 includes a vertical active region and a vertical blanking region. The vertical active region includes pixel data that make up the image to be displayed at the display panel 160. The vertical blanking region includes metadata such as audio packets or information indicating how the display device 140 is to interpret the pixel data. During the period of time in which the display controller 155 reads the vertical blanking region (referred to as the vertical blanking interval), the display panel 160 displays the image that was last transmitted by the GPU 115 in the previous vertical active region. In some embodiments, the display device 140 is configured to have a blanking interval of variable length that is programmable by the GPU 115. Accordingly, in some embodiments, GPU 115 adjusts the refresh rate of the display device 140 by programming different lengths for the blanking interval.

To conserve power, the rendering device 105 uses the high bandwidth of the interconnect 135 and the high compression ratios of compression techniques such as DSC to transmit frames of pixel data to the display device 140 at an accelerated rate that is higher than the rate at which the display device 140 scans out the pixel data to update the display panel 160 and places one or more portions of the rendering device 105 in a reduced power state while the display device 140 is updating the display panel 160. Thus, rather than synchronizing the pixel data transmission rate of the frame 130 with the rate at which pixel data is output to the display device 140 to update the display panel 160 (referred to herein as the pixel data consumption rate), the GPU 115 decouples the pixel data transmission rate from the pixel data consumption rate of the display device 140 and gains time in which to place components of the rendering device 105 in a reduced power state by accelerating the rate of transmission of pixel data to the display device 140.

As the GPU 115 transmits a frame 130 of pixel data at the accelerated rate via the IF 125 to the IF 145, the display device 140 stores the frame 130 at the memory 150. The display controller 155 immediately accesses the pixel data at a slower rate (referred to as the "consumption rate") to update the display panel 160. Thus, for each refresh cycle of the display panel 160, the GPU 115 transmits a frame 130 of pixel data to the display device 140 during a first portion of the refresh cycle that is less than the full duration of the refresh cycle. Meanwhile, the display device 140 consumes the pixel data by reading the pixel data from the memory 150 and updating the display panel 160 both during the first portion of the refresh cycle and for additional portions (or all of) the refresh cycle.

Conventionally, the pixel data transmission rate is synchronized with the rate at which the display panel 160 is updated such that each frame is transmitted over a period of time that is the same length as the period of time in which the display controller 155 reads a frame of pixel data from the memory 150 and updates the display panel 160. To illustrate, for a display device 140 that supports Consumer Electronics Association (CEA) 1080p60 timing (i.e., a resolution of 1920×1080 pixels refreshing at a rate of 60 frames per second), the pixel clock rate is 148.5 MHz, and each frame has a vertical total of 1125 lines and a horizontal total of 2200 pixels. The vertical active portion of the frame is 1080 lines and the vertical blanking region is 45 lines (i.e., 1125 minus 1080 lines). Thus, the vertical active period is $$(1080*2200)/148.5=16.00 \text{ ms}$$

and the vertical blanking period is $$((1125-1080)*2200)/148.5=0.666 \text{ ms}.$$

By decoupling the pixel data transmission rate from the pixel data consumption rate of the display device 140, the GPU 115 can extend the time between completion of transmission of a frame 130 of pixel data to the display device 140 and the beginning of transmission of the next frame of pixel data in a video stream, effectively extending the vertical blanking period between frames. In order to increase the GPU transmission rate to output pixel data at an increased rate, the pixel clock rate must be increased. For example, to output pixel data at a 240 Hz rate, the pixel clock rate must be increased to 594 MHz:

148.5 MHz*(240/60)=594 MHz.

Thus, the GPU 115 can complete transmission of the same vertical active region of 1080 lines in a much shorter time:

(1080*2200)/594=4 ms

Meanwhile, the display controller 115 is not changing the refresh rate of the panel, so the display controller 155 maintains a 60 Hz refresh rate, such that new pixel data is transmitted every 16.666 ms. Given that the GPU 115 now transmits the vertical active region within 4 ms, the GPU 115 increases vertical blanking interval to 16.666−4=12.666 ms by increasing the number of vertical total lines to (16.666*594000)/2200=4500 lines Thus, for accelerated transmission of pixel data, the GPU implements the following parameters:
  Pixel clock rate=594 MHz
  Vertical Total=4500 lines
  Horizontal Total=2200 pixels
  Vertical Active=1080 lines
  Vertical Blanking=3420 lines The refresh rate of the display device 140 has not changed, because in this example a new frame is still transmitted every 16.666 ms. In addition, the vertical active region of the frame still consists of 1080 lines because the amount of pixel data has not changed.

In embodiments in which the display device 140 is implemented as a VRR display, the duration of the extended vertical blanking period is based on the difference between the accelerated frame transmission rate and the variable rate at which the GPU 115 transmits an updated frame to the display device 140. In some embodiments, the GPU 115 uses the extended vertical blanking period to reduce power to components of the rendering device 105 such as the memory 120 and one or both of the display interfaces 125, 145.

For example, in some embodiments the GPU 115 includes a power control module 117 that controls a power mode of portions of the rendering device 105 such as the memory 120 and the display interface 125. In some embodiments, the power control module 117 also controls a power mode of portions of the display 140 such as the display interface 145. The power control module 117 is implemented as hard-coded or programmable logic, one or more processors executing software/firmware instructions, or any combination thereof. The power control module 117 determines a threshold time required to reduce power from an operating power state to a reduced power state and to subsequently restore power to the operating power state for portions of the rendering device 105. If the length of the extended vertical blanking period exceeds the threshold time, the power control module 117 reduces power to one or more portions of the rendering device 105 (and, in some embodiments, to the display interface 145) and subsequently restores power to the one or more portions of the rendering device 105 to the operating power state during the extended vertical blanking period. In this way, the GPU 115 conserves power by accelerating transmission of pixel data to the display device 140 and extending the vertical blanking period.

Figure 2:
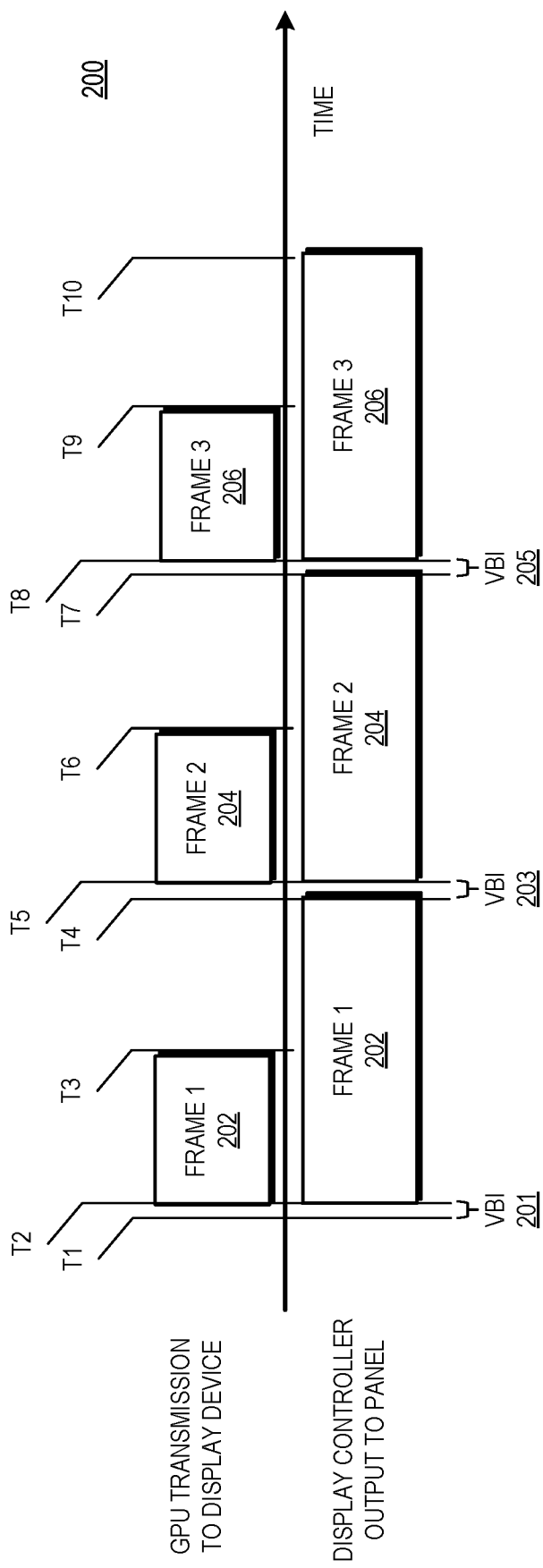
FIG. 2 is a diagram illustrating a graphics processing unit (GPU) of the processing system transmitting frames of pixel data to the display device at a higher rate than the display panel update rate in accordance with some embodiments.

FIG. 2 illustrates the GPU 115 of the processing system 100 of FIG. 1 transmitting active vertical regions of frames of pixel data to the display device 140 at a higher rate than the rate at which the display device 140 uses the pixel data to update the display panel 160 in accordance with some embodiments. At a time T1, the GPU begins sending vertical blanking data identifying the beginning of a vertical blanking interval (VBI) 201 to indicate a refresh of the display panel 160 and the start of a new frame. The VBI 201 ends at time T2, when the GPU 115 transmits pixel data for the active vertical region of a current frame, illustrated as frame 1 202, to the display device 140 while the display controller 155 scans out the active vertical region of frame 1 202, to the display panel 160. Because the GPU 115 transmits the active vertical region of frame 1 202 at a higher rate than the rate at which the display controller 155 scans out frame 1 202 to the display panel 160, the GPU 115 completes transmitting the active vertical region of frame 1 202 at time T3, while the display controller 155 is still outputting frame 1 202 to the display panel 160. The display controller 155 completes outputting frame 1 202 to the display panel at time T4, when a vertical blanking interval VBI 203 signaling a refresh of the display panel 160 begins. The VBI 203 ends at time T5.

At time T5, the GPU 115 begins transmitting the active vertical region of frame 2 204 to the display device 140 and the display controller 155 begins outputting frame 2 204 to the display panel 160. At time T6, the GPU 115 completes transmission of the active vertical region of frame 2 204 to the display device 140, and at time T7, the display controller 155 completes outputting frame 2 204 to the display panel 160. At time T7 the GPU 115 begins the vertical blanking interval VBI 205 signaling a refresh of the display panel 160. At time T8, the GPU 115 begins transmitting the active vertical region of frame 3 206 to the display device 140 and the display controller 155 begins outputting frame 3 206 to the display panel 160. At time T9, the GPU 115 completes transmission of the active vertical region of frame 3 206 to the display device 140. At time T10, the display controller 155 completes scanning out frame 3 206 to the display panel 160.

Placing a component in a lower power state and restoring the component to an operational power state when the component is needed again takes time, and the typical vertical blanking interval of 0.46 ms limits the components the GPU 115 can place in a lower power state and the amount of time the components can stay in a lower power state. By accelerating transmission of the active vertical regions of frame 1 202, frame 2 204, and frame 3 206 from the GPU 115 to the display device 140, the GPU 115 gains additional time (from time T3 to time T4, from time T6 to time T7, and from time T9 to time T10) during which the GPU 115 can place components such as the memory 120 in a lower power state.

Figure 3:
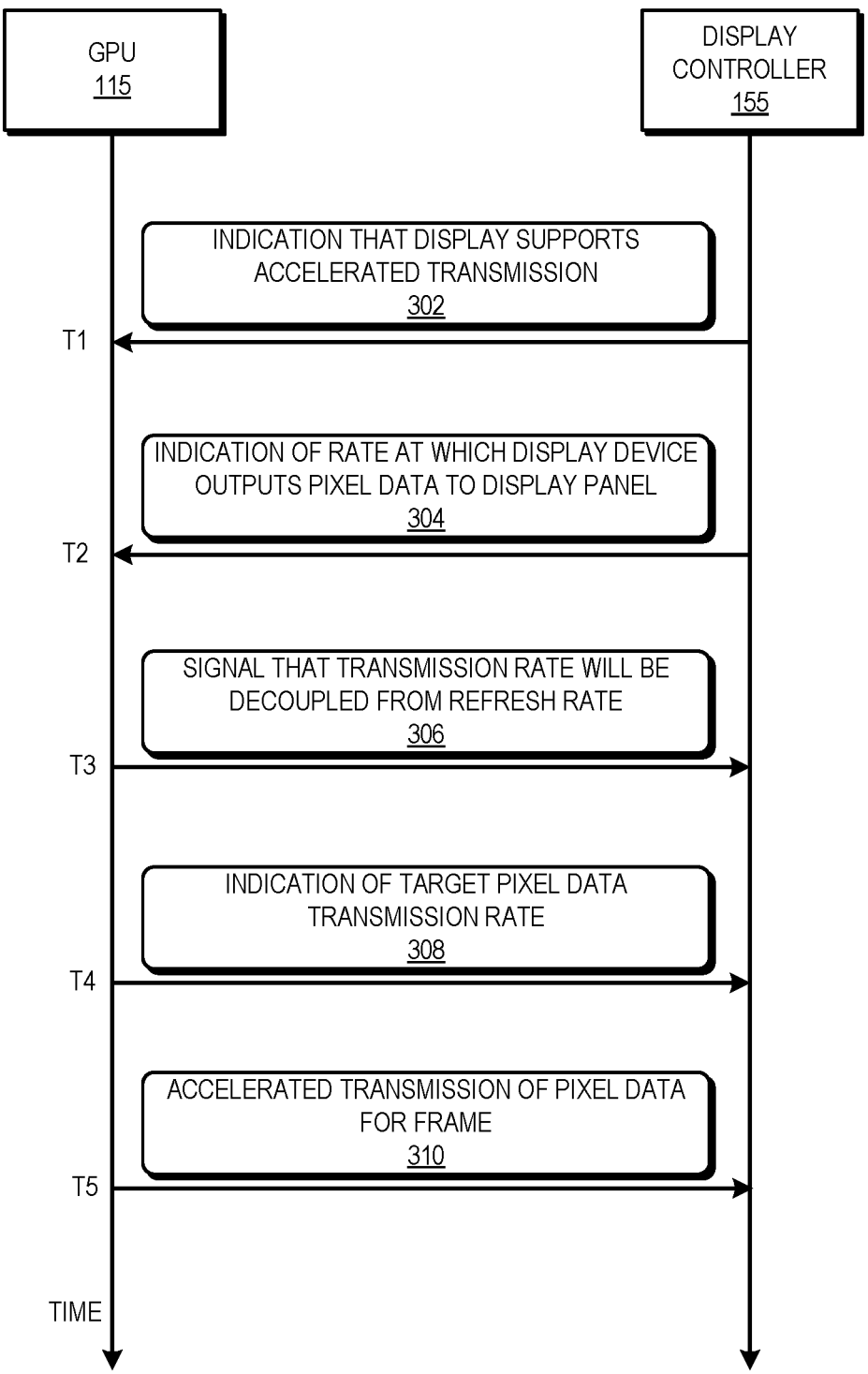
FIG. 3 is a diagram illustrating the GPU communicating with the display device to set a transmission rate for the GPU to transmit frames of pixel data to the display device that is decoupled from the display panel update rate 1 in accordance with some embodiments.

FIG. 3 is a diagram illustrating the GPU 115 communicating with the display device 140 to negotiate a transmission rate for the GPU 115 to transmit frames of pixel data to the display device 140 that is decoupled from the rate at which the display device 140 uses the pixel data to update the display panel 160 in accordance with some embodiments. At time T1, the GPU 115 receives an indication 302 from the display controller 155 that the display device 140 is capable of supporting accelerated transmission of pixel data. In some embodiments, the indication 302 is metadata formatted according to the VESA DisplayID (DID) or Extended Display Identification Data (EDID) standards and indicates the native capabilities of the display panel 160 and/or the interface 145. The DID or EDID data informs the GPU 115 of the resolutions, timings, and bit depths that are supported by the display panel 160 as well as the bandwidth and link rates supported by the interface 145. For example, HDMI and DisplayPort interfaces support different bandwidths and link rates that vary based on the bandwidth of the interconnect 135. The bandwidth of the interconnect 135 is also affected by external factors such as the condition of the cable or wireless connection between the rendering device 105 and the display device 140.

In some embodiments, the display controller 155 communicates the capabilities of the interconnect 135 to the GPU 115 through a handshaking process referred to as link training. In addition to communicating the native capabilities of the display panel 160, the interface 145, and the interconnect 135, at time T2 the display controller 155 sends an indication 304 of a maximum pixel transmission rate at which the display device will receive pixel data from the GPU 115. The indication 304 indicates a maximum fixed pixel data transfer rate or a maximum multiplier of a pixel data transfer rate based on the native capabilities of the display panel 160 (referred to as the native pixel data transmission rate) that the GPU 115 can use to transfer pixel data to the display device 140. For example, in some embodiments the indication 304 indicates that the display device 140 is capable of accepting transmission of pixel data at a rate of up to 540 MHz. In some embodiments, the indication 304 indicates that the display device 140 is capable of accepting transmission of pixel data at a rate of up to eight times or four times faster than the native pixel data transmission rate.

In response to receiving the indication 304 of the maximum pixel data transmission rate that the display device 140 is capable of receiving, the GPU 115 determines a fixed rate or multiplier of the native pixel data transmission rate at which to transmit pixel data to the panel device 140 based on a detected compression ratio of the pixel data and bandwidth of the interconnect 135. Transmitting pixel data at a higher rate consumes resources such as voltage, and the GPU 115 determines an acceptable cost for transmitting pixel data. Based on the cost, in some embodiments the GPU 115 sets a target pixel data transmission rate that is lower than the maximum pixel data transmission rate that the display device 140 is capable of receiving.

For example, if the indication 304 indicates that the display device 140 is capable of receiving pixel data at a rate that is eight times faster than the native pixel data transmission rate but the GPU 115 determines that transmitting at an eight times faster rate will consume an unacceptably high voltage based on the cost, in some embodiments the GPU 115 sets the target pixel data transmission rate at four times the native pixel data transmission rate. Conversely, if the GPU 115 determines that the cost of transmitting data to the display device 140 at a rate that is eight times faster than the native pixel data transmission rate is not unacceptably high, the GPU 115 sets the target pixel data transmission rate at eight times the native pixel data transmission rate. In some embodiments, the GPU 115 compares the cost of transmitting pixel data at a given rate to a threshold to determine if the cost is acceptable.

In response to setting the target pixel data transmission rate, at time T3 the GPU 115 sends a signal 306 to the display controller 155 that the pixel data transmission rate will be decoupled from the rate at which the display device 140 outputs the pixel data to update the display panel 160. In some embodiments, at time T4 the GPU 115 sends the display controller 155 an indication 308 of the target pixel transmission rate. Thus, for example, if the GPU 115 determines that the target pixel data transmission rate is four times faster than the native pixel data transmission rate, the GPU sends the display device 155 an indication 308 that the GPU 115 will transmit frames of pixel data at a target pixel data transmission rate that is four times faster than the native pixel data transmission rate.

At time T5, the GPU 115 transmits a frame 130 of pixel data at the target pixel data transmission rate. The difference between the target pixel data transmission rate and the native pixel data transmission rate determines the amount of time by which the vertical blanking interval is extended by the accelerated frame transmission. Based on the amount of time by which the vertical blanking interval is extended, the GPU 115 places components of the rendering device such as the memory 120 into a reduced power state to conserve power and memory bandwidth.

Figure 4:
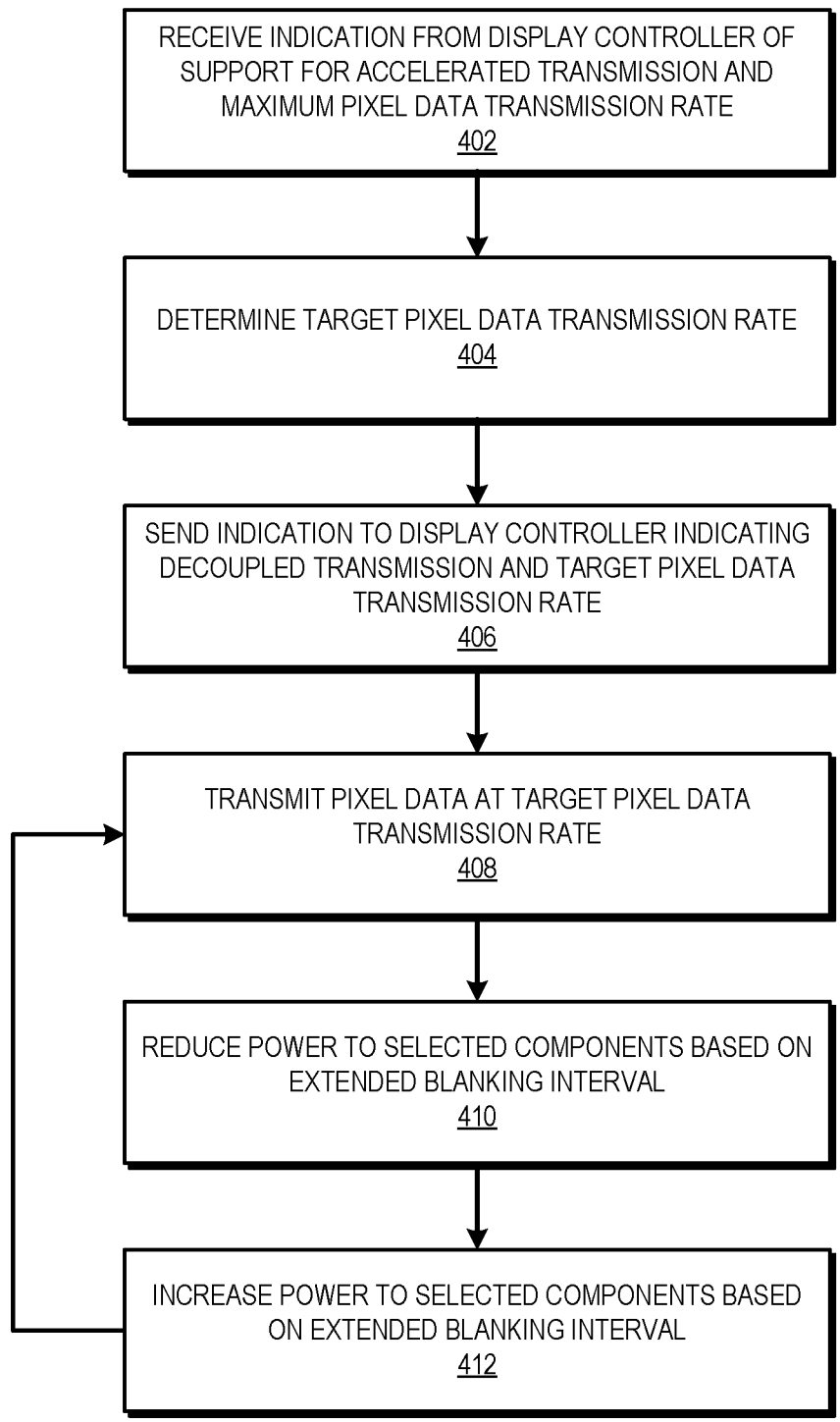
FIG. 4 is a flow diagram illustrating a method for decoupling a rate at which the GPU transmits frames of pixel data to the display device from the display panel update rate in accordance with some embodiments.

FIG. 4 is a flow diagram illustrating a method 400 for decoupling a rate at which the GPU 115 transmits frames of pixel data to the display device 140 from the rate at which the display device 140 uses the pixel data to update the display panel 160 in accordance with some embodiments. At block 402, the GPU 115 receives an indication 302 from the display controller 155 that the display device 140 is capable of supporting accelerated transmission and a maximum pixel data transmission rate at which the display device 140 is capable of receiving pixel data from the GPU 115. The maximum pixel data transmission rate at which the display device 140 is capable of receiving pixel data from the GPU 115 is based on the native pixel data transmission rate capabilities of the display device 140 and the interconnect 135. For example, in some embodiments in which the rate at which the display controller 155 uses pixel data to update the display panel 160 (referred to as the native pixel data consumption rate) is 60 Hz, the display controller 155 indicates a maximum pixel data transmission rate of 480 Hz, or eight times the native pixel data consumption rate.

At block 404, in response to receiving the indication 302, the GPU 115 determines a target pixel data transmission rate for transmitting frames of pixel data to the display device 140. The GPU 115 determines the target pixel data transmission rate is based on the maximum pixel data transmission rate indicated by the display controller 155 and a cost associated with accelerating the pixel data transmission rate. In some embodiments, the GPU 115 compares the cost with a threshold to determine the target pixel data transmission rate. For example, in some embodiments, if the maximum pixel data transmission rate indicated by the display controller 155 is 480 Hz, but the GPU 115 determines that the cost associated with accelerating the pixel data transmission rate to 480 Hz exceeds the threshold, the GPU 115 determines that the target pixel data transmission rate is 240 Hz.

At block 406, the GPU 115 signals to the display device 140 that the pixel data transmission rate will be decoupled from the rate at which the display device 140 uses pixel data to update the display panel 160 based on a refresh rate of the display panel 160. The GPU 115 also indicates to the display device 140 the target pixel data transmission rate. At block 408, the GPU 115 transmits a frame of pixel data at the target pixel data transmission rate to the display device 140. In response to receiving the frame of pixel data, the display controller 155 stores the frame of pixel data at the memory 150. In some embodiments, the display controller 155 stores the frame of pixel data at the back frame buffer of the memory 150. The display controller 155 continues to update the display panel 160 at the native refresh rate of 60 Hz.

At block 410, the GPU 115 uses the extended vertical blanking interval created by the accelerated transmission of the frame 130 to place selected components of the rendering device 105 in a reduced power state. In some embodiments, the GPU 115 signals the display controller 155 to reduce a power state of components of the display device 140 such as the interface 145 during the extended vertical blanking interval. At block 412, the GPU 115 increases power to the selected components of the rendering device 105 based on the length of the extended vertical blanking interval so that power will be restored in time to transmit the next frame to the display device 140. The method flow then continues back to block 408 for transmission of the next frame at the target pixel data transmission rate.

In some embodiments, the apparatus and techniques described above are implemented in a system including one or more integrated circuit (IC) devices (also referred to as integrated circuit packages or microchips), such as the processing system described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
transmitting pixel data for a first frame from a processor to a display device at a first rate that is based on a detected compression ratio of the pixel data and that is higher than a maximum pixel data transmission rate indicated for the display device.

2. The method of claim 1, further comprising:
receiving at the processor from the display device an indication that the display device is capable of supporting accelerated transmission of pixel data.

3. The method of claim 1, further comprising:
placing a portion of the processor in a reduced power state in response to the processor completing transmission of the first frame to the display device.

4. The method of claim 3, wherein the portion of the processor comprises one of a memory from which the processor accesses pixel data and an interface through which the processor transmits pixel data.

5. The method of claim 1, further comprising:
receiving at the processor from the display device an indication of a rate at which the display device outputs the pixel data to refresh a display panel; and
signaling to the display device that the first rate will be decoupled from the rate at which the display device uses the pixel data to update the display panel.

6. The method of claim 1, further comprising:
storing the first frame at a frame buffer during a first refresh cycle of a display panel; and
scanning the first frame out from the frame buffer to the display panel during the first refresh cycle.

7. The method of claim 1, wherein the first rate is based on the detected compression ratio of the pixel data and a bandwidth of an interconnect connecting the processor to the display device.

8. A method, comprising:
compressing pixel data for a first frame; and
transmitting the pixel data from a processor to a display device at a first rate that is higher than a maximum pixel data transmission rate indicated for the display device, the first rate being based on a detected compression ratio of the pixel data and on a bandwidth of an interconnect connecting the processor to the display device.

9. The method of claim 8, wherein the first rate is decoupled from a rate at which the display device outputs the pixel data to refresh a display panel.

10. The method of claim 8, further comprising:
receiving at the processor from the display device an indication that the display device is capable of supporting accelerated transmission of pixel data.

11. The method of claim 10, further comprising:
receiving at the processor from the display device an indication of a rate at which the display device scans out the pixel data to refresh a display panel; and
signaling to the display device that the first rate will be decoupled from the rate at which the display device scans out the pixel data to refresh the display panel.

12. The method of claim 11, further comprising:
storing the first frame at a frame buffer during a first refresh cycle of the display panel; and
scanning the first frame out from the frame buffer to the display panel during the first refresh cycle.

13. The method of claim 8, further comprising:
placing a portion of the processor in a reduced power state in response to the processor completing transmission of the first frame to the display device.

14. The method of claim 13, wherein the portion of the processor comprises one of a memory from which the processor accesses pixel data and an interface through which the processor transmits pixel data.

15. A processor comprising:
a graphics processing unit (GPU) configured to:
compress pixel data for a first frame; and
transmit the pixel data to a display device at a first rate that is higher than a maximum pixel data transmission rate indicated for the display device, wherein the first rate is based on a detected compression ratio of the pixel data and on a bandwidth of an interconnect connecting the GPU to the display device.

16. The processor of claim 15, wherein the first rate is independent of a rate at which the display device scans out the pixel data to refresh a display panel.

17. The processor of claim 16, wherein the GPU is further configured to:
receive from the display device an indication of the rate at which the display device scans out the pixel data to refresh the display panel; and
signal to the display that the first rate will be decoupled from the rate at which the display device scans out the pixel data to refresh the display panel.

18. The processor of claim 16, wherein the GPU is further configured to:
receive from the display device an indication that the display device is capable of supporting accelerated transmission of pixel data.

19. The processor of claim 15, wherein the GPU is further configured to:
place a portion of the processor in a reduced power state in response to the GPU completing transmission of the first frame to the display device.

20. The processor of claim 19, wherein the portion of the processor comprises one of a memory from which the processor accesses pixel data and an interface through which the processor transmits pixel data.

\* \* \* \* \*